United States Patent [19]

Stendahl

[11] 4,274,478

[45] Jun. 23, 1981

[54] APPARATUS FOR COOLING DUST-CONTAINING GAS

[75] Inventor: Gunnar Stendahl, Linkoping, Sweden

[73] Assignee: STAL-LAVAL Apparat AB, Linkoping, Sweden

[21] Appl. No.: 14,104

[22] Filed: Feb. 22, 1979

[30] Foreign Application Priority Data

Feb. 23, 1978 [SE] Sweden .................................. 7802096

[51] Int. Cl.³ ........................ F28D 13/00; F23C 11/02
[52] U.S. Cl. ................................. 165/104.16; 34/57 A
[58] Field of Search ............ 165/104 F; 423/DIG. 16; 34/57 A, 57 R

[56] References Cited

U.S. PATENT DOCUMENTS

| 2,884,373 | 4/1959 | Bailey | 165/104 F |
| 3,721,608 | 3/1973 | Saller | 34/57 A |
| 3,908,284 | 9/1975 | Beranek | 165/104 F |
| 4,130,071 | 12/1978 | Porter | 34/57 A |

*Primary Examiner*—George E. Lowrance
*Attorney, Agent, or Firm*—Watson, Cole, Grindle & Watson

[57] ABSTRACT

Apparatus for the cooling and distribution of dust-containing gas in a bed containing a powdered or granular material mixture with structure for blowing gas under pressure into the powdered material to obtain a so-called fluidized bed with the powdered material kept in flotation. The gas blowing structure includes straight, horizontally positioned distributing tubes located at the lower portion of the bed. A plurality of tubes may be provided for drawing water through the bed with the powdered material arranged around the tubes.

5 Claims, 2 Drawing Figures

APPARATUS FOR COOLING DUST-CONTAINING GAS

BACKGROUND

Field of the Invention

The present invention relates to apparatus for cooling and distributing dust-containing gas.

In connection with the discharge of hot gas (air), containing dust, it is desirable to filter the gas to prevent pollution and fouling of the environment. To prevent the filter from being damaged by too hot gas, it is desirable to reduce the gas temperature for the filter in some suitable manner, and preferably in this connection utilize parts of the heat contents of the gas. If this gas should be conducted directly around tubes containing cooling water, the dust would adhere around the cooling tubes.

Another problem is that the dust easily clogs the tubes through which the gas is transported, and therefore a high gas speed must be maintained to prevent such clogging.

SUMMARY OF THE INVENTION

The invention aims to provide a solution to the above-mentioned problems and other problems associated therewith and is characterized in that dust-containing gas is arranged to be blown in, under pressure from below, through a powdered material mixture, such as sand, to achieve a so-called fluidized bed, a plurality of cooling tubes filled with water being drawn through the bed, the powdered material being arranged around the cooling tubes, whereby the gas passes through the powdered material, and the temperature of the gas while passing through the bed is reduced while at the same time the powdered material is kept floating.

The invention includes, among other things, the following advantages:

(1) Clogging by dust is prevented, and the gas temperature is reduced to a level suitable for a subsequent filter;
(2) A uniform gas distribution over the entire bed is easily achieved;
(3) The cooling water in the tubes is heated, and this heat recovery can be utilized in many ways;
(4) The construction is simple.

BRIEF DESCRIPTION OF THE DRAWINGS

The means according to the invention is exemplified in greater detail in the accompanying drawing, in which.

DETAILED DESCRIPTION

Figure 1:
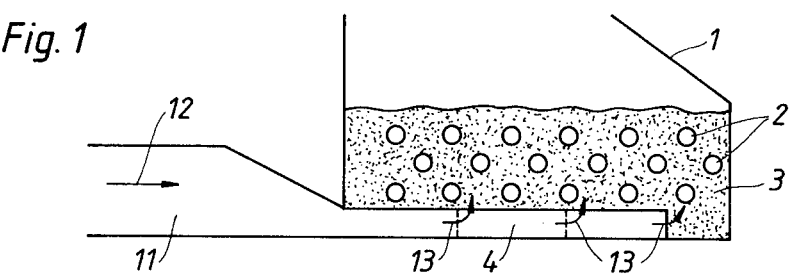
FIG. 1 shows a distribution device seen from the side.

FIG. 1 shows a so-called fluidized bed in container 1, open at the top, a number of tubes 2 with cooling water extending across container 1, the cooling water is heated by gas passing outside tubes 2, which gas in turn is to be cooled. A powdered material, such as sand 3, is arranged around tubes 2, a number of horizontally extending, straight tubes 4 opening out at the bottom of the fluidized bed thus formed.

Figure 2:
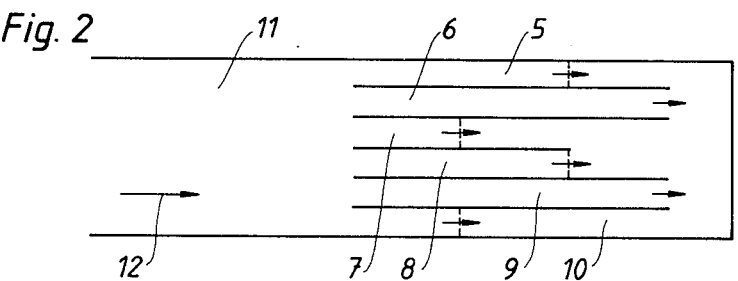
FIG. 2 shows the same device seen from above (without sand).

FIG. 2 shows the extension of tubes 4, and it is clear that a plurality of tubes 5–10 are arranged in the extension of a thicker supply tube 11 and open out at different distances from the supply tube, inside the bed (reference the arrows at the right-hand side of FIG. 2).

Dust-containing gas of high temperature, such as flue gases from a furnace, enters at arrow 12 in supply tube 11, and is distributed among small tubes 5–10. To prevent clogging by the dust the gas must have a high speed, suitably exceeding 25 m/s, preferably 25–50 m/s. When the gas passes up through the bed (see the arrows 13 in FIG. 1), the sand 3 is kept floating (fluidized bed) around tubes 2, and because of the extension of distributing tubes 5–10 with their different lengths, a uniform distribution of the gas is obtained over the surface of the bed. Further, the pressure drop when the gas enters into the bed is not too high.

The apparatus has such a shape that sand will not flow backwards in the distributing tubes 5–10. Upon start-up, any sand residues remaining in the tubes 5–10 are easily blown away. The temperature of the dust-containing gas should be reduced to such an extent that the subsequent filters are not damaged.

When the gas passes through the bed, the cooling water in the tubes 2 is heated, and this heat recovery can be utilized in many well known ways. The movable sand 3 prevents dust from depositing on the tubes, and the efficiency of the heat transmission is good.

Sand is only one example of a possible powdered material in the bed. It is also obvious that part of the dust will accumulate on the powder particles, and therefore a certain amount of cleaning can be achieved here as well. The powdered material should be easy to replace and/or supplement.

The apparatus according to the above can be varied in many ways within the scope of the following claims.

What is claimed is:

1. Apparatus for cooling, feeding and distribution of dust-containing gas, comprising:
   a bed containing a powdered or granular material mixture; and
   means for blowing gas under pressure into said material mixture to form a fluidized bed with said material mixture being maintained floating and including a plurality of straight, horizontally extending tubes at the lower portion of the bed for the supply of the dust-containing gas, said tubes each having a different length and an orifice at each tube end within the bed, such that the orifices are distributed over the bottom area of the bed.

2. Apparatus according to claim 1, wherein said distributing tubes have different lengths and open out partly adjacent to each other, partly at at least two different distances from the beginning of the bed to bring about an even distribution of the gas over the bed.

3. Apparatus according to claim 2, wherein the gas is blown in at a flow rate of 25 to 50 m/s.

4. Apparatus according to any one of claims 1, further comprising a plurality of tubes for drawing water through the bed and wherein said powdered material is arranged around said tubes.

5. Apparatus according to any one of claims 2, 3, 4 or 1, wherein the distributing tubes are arranged in contact with the bed material to cool the tubes.

* * * * *